(12) United States Patent
Lin

(10) Patent No.: US 11,841,046 B2
(45) Date of Patent: Dec. 12, 2023

(54) HINGE FOR A FOLDABLE ELECTRONIC DEVICE WITH A FLEXIBLE DISPLAY

(71) Applicant: FOSITEK CORPORATION, New Taipei (TW)

(72) Inventor: Chun-Han Lin, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 145 days.

(21) Appl. No.: 17/456,702

(22) Filed: Nov. 29, 2021

(65) Prior Publication Data

US 2023/0067187 A1 Mar. 2, 2023

(30) Foreign Application Priority Data

Aug. 30, 2021 (TW) .................................. 110132025

(51) Int. Cl.
| | | |
|---|---|---|
| *F16C 11/04* | (2006.01) | |
| *G06F 1/16* | (2006.01) | |
| *E05D 3/18* | (2006.01) | |

(52) U.S. Cl.
CPC ............ *F16C 11/04* (2013.01); *G06F 1/1652* (2013.01); *G06F 1/1681* (2013.01); *E05D 3/18* (2013.01); *E05Y 2900/606* (2013.01)

(58) Field of Classification Search
CPC ...... F16C 11/04; G06F 1/1652; G06F 1/1681; E05D 3/18; E05Y 2900/606; H05K 5/0226

See application file for complete search history.

(56) References Cited

U.S. PATENT DOCUMENTS

| | | | | | |
|---|---|---|---|---|---|
| 9,512,655 | B2* | 12/2016 | Kuo | .......................... | E05D 1/04 |
| 9,518,414 | B1* | 12/2016 | Chen | ..................... | E05D 11/082 |
| 9,784,406 | B1* | 10/2017 | Lin | ......................... | G06F 1/166 |
| 9,823,706 | B2* | 11/2017 | Chen | ......................... | E05D 3/02 |
| 9,879,715 | B1* | 1/2018 | Hsu | ......................... | E05D 11/00 |
| 9,939,851 | B2* | 4/2018 | Lan | ......................... | F16M 11/10 |
| 9,946,301 | B2* | 4/2018 | Lan | ......................... | G06F 1/1681 |
| 10,001,162 | B2* | 6/2018 | Hsu | ......................... | F16C 11/04 |
| 10,001,815 | B1* | 6/2018 | Yao | ......................... | H05K 5/0234 |
| 10,036,188 | B1* | 7/2018 | Yao | ......................... | G06F 1/1681 |
| 10,620,672 | B2* | 4/2020 | Tomky | .................. | E05D 11/082 |
| 11,416,039 | B2* | 8/2022 | Hsu | ......................... | H04M 1/022 |
| 11,543,854 | B2* | 1/2023 | Park | ...................... | G06F 1/1681 |
| 11,553,612 | B2* | 1/2023 | Chen | ..................... | H04M 1/022 |
| 11,567,544 | B2* | 1/2023 | Liu | .......................... | F16C 11/04 |

(Continued)

FOREIGN PATENT DOCUMENTS

TW M614529 U * 4/2021

*Primary Examiner* — Victor D Batson
*Assistant Examiner* — Matthew J Sullivan
(74) *Attorney, Agent, or Firm* — Burris Law, PLLC

(57) ABSTRACT

A hinge includes a base seat, two connecting members and two sliding members. The base seat has two first arcuate rails each extending around a first rotating axis. Each connecting member has a first sliding portion matingly engaged with and slidable along the respective first arcuate rail, and a second arcuate rail extending around a second rotating axis. Each sliding member has a second sliding portion matingly engaged with and slidable along the second arcuate rail such that the two sliding members are rotatable relative to the base seat between an initial position and a terminal position about the first rotating axes and about the second rotating axes.

5 Claims, 14 Drawing Sheets

(56) References Cited

U.S. PATENT DOCUMENTS

| | | | | |
|---|---|---|---|---|
| 11,617,277 B2* | 3/2023 | Huang | ............ | F16C 11/04 |
| | | | | 361/807 |
| 11,622,457 B2* | 4/2023 | Hsu | ............ | G06F 1/1616 |
| | | | | 361/809 |
| 11,624,221 B1* | 4/2023 | Hsu | ............ | G06F 1/1681 |
| | | | | 16/354 |
| 2020/0183464 A1* | 6/2020 | Lin | ............ | G06F 1/1616 |
| 2021/0055763 A1* | 2/2021 | Park | ............ | G06F 1/1681 |
| 2021/0173449 A1* | 6/2021 | Yao | ............ | G06F 1/1616 |
| 2021/0318723 A1* | 10/2021 | Cheng | ............ | G06F 1/1681 |
| 2022/0083106 A1* | 3/2022 | Su | ............ | G06F 1/1681 |
| 2022/0116489 A1* | 4/2022 | Nagai | ............ | G06F 1/1681 |
| 2022/0346256 A1* | 10/2022 | Kim | ............ | H05K 5/0018 |
| 2022/0365569 A1* | 11/2022 | Hsu | ............ | G06F 1/1681 |
| 2022/0365570 A1* | 11/2022 | Hsu | ............ | G06F 1/1681 |
| 2022/0377919 A1* | 11/2022 | Zhang | ............ | F16C 11/04 |
| 2023/0063210 A1* | 3/2023 | Hsu | ............ | G06F 1/1652 |

* cited by examiner

HINGE FOR A FOLDABLE ELECTRONIC DEVICE WITH A FLEXIBLE DISPLAY

CROSS-REFERENCE TO RELATED APPLICATION

This application claims priority of Taiwanese Patent Application No. 110132025, filed on Aug. 30, 2021.

FIELD

The disclosure relates to a hinge, and more particularly to a hinge for a foldable electronic device with a flexible display.

BACKGROUND

The foldable electronic device with a flexible display screen has gradually developed in daily life. Such foldable electronic device generally has a hinge to connect two housing bodies for supporting the flexible display screen. The hinge generally has sliding members and rails slidably mating with each other to generate a constant rotating mode. Such constant rotating mode cannot meet a bending requirement of the flexible display screen during folding of the electronic device. It is desirable to develop a hinge which can sufficiently meet a bending requirement of the flexible display screen of an electronic device.

SUMMARY

Therefore, an object of the disclosure is to provide a hinge that can sufficiently meet a bending requirement of the flexible display of an electronic device.

According to an aspect of the disclosure, a hinge includes a base seat, two connecting members and two sliding members. The base seat has two first arcuate rails which are spaced apart from, aligned with and symmetric to each other in a first direction. Each of the first arcuate rails extends around a first rotating axis which extends in a second direction that is transverse to the first direction. The first rotating axes of the first arcuate rails are spaced apart from and aligned with each other in the first direction. Each of the two connecting members has a first sliding portion which is matingly engaged with and slidable along a respective one of the first arcuate rails to permit rotation of each of the connecting members about the first rotating axis relative to the base seat, and a second arcuate rail which extends around a second rotating axis that is parallel to and offset from the first rotating axis. The second rotating axes of the second arcuate rails are spaced apart from and aligned with each other in the first direction. Each of the two sliding members has a second sliding portion which is matingly engaged with and slidable along the second arcuate rail to permit rotation of each of the sliding members about the second rotating axis relative to a corresponding one of the connecting members such that the two sliding members are rotatable relative to the base seat between an initial position and a terminal position.

With the first arcuate rails and the second arcuate rails, each of the sliding members is rotatable relative to the base seat about the corresponding first rotating axis and about the corresponding second rotating axis so as to generate a variational rotating path of the sliding members. Moreover, the positions of the first rotating axes and the second rotating axes can be varied and adjusted according to a flexible display of a foldable electronic device so as to meet the bending requirement of the flexible display.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
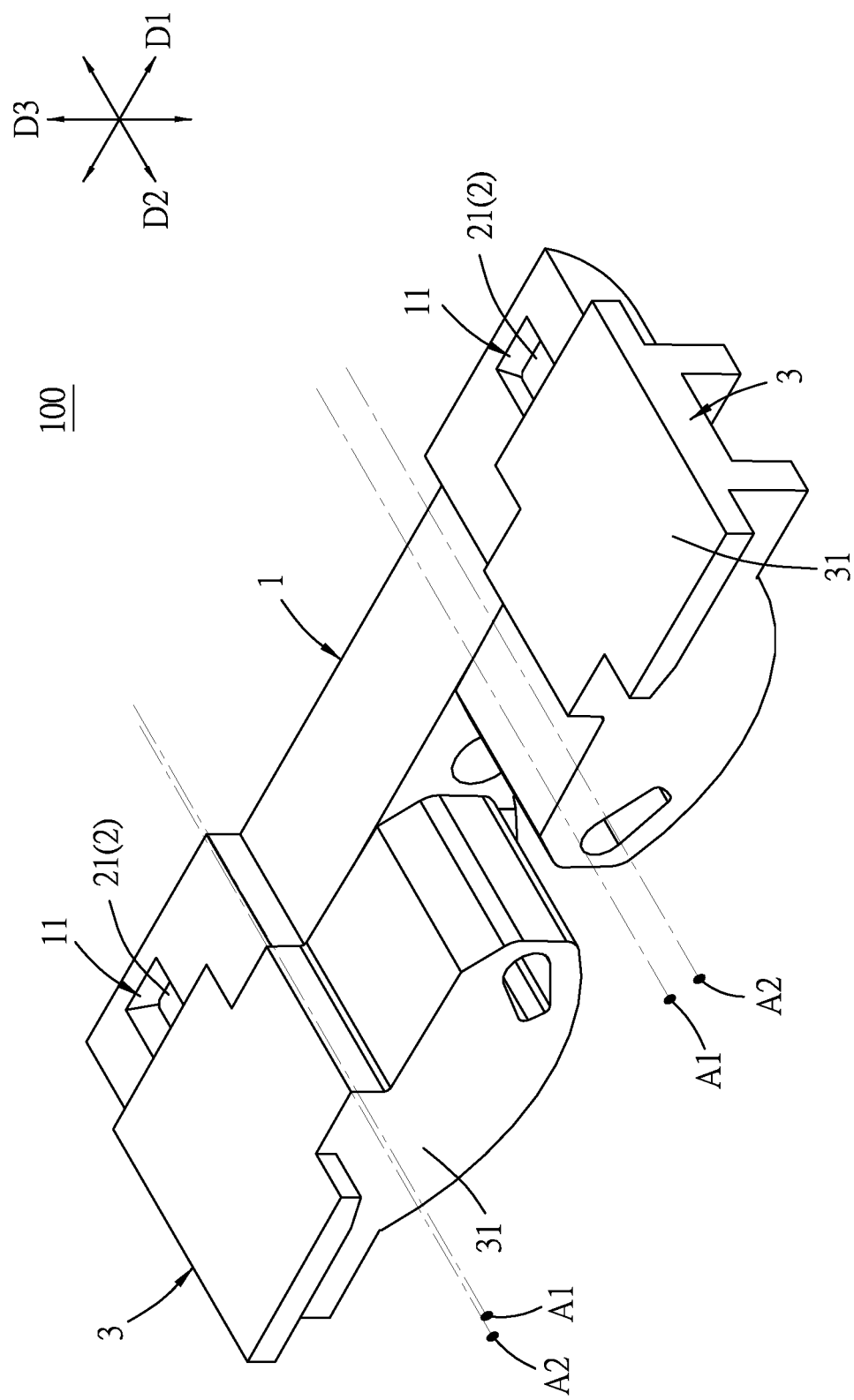
FIG. 1 is a perspective view illustrating an embodiment of a hinge according to the disclosure in a state when two sliding members are in an initial position.
Figure 2:
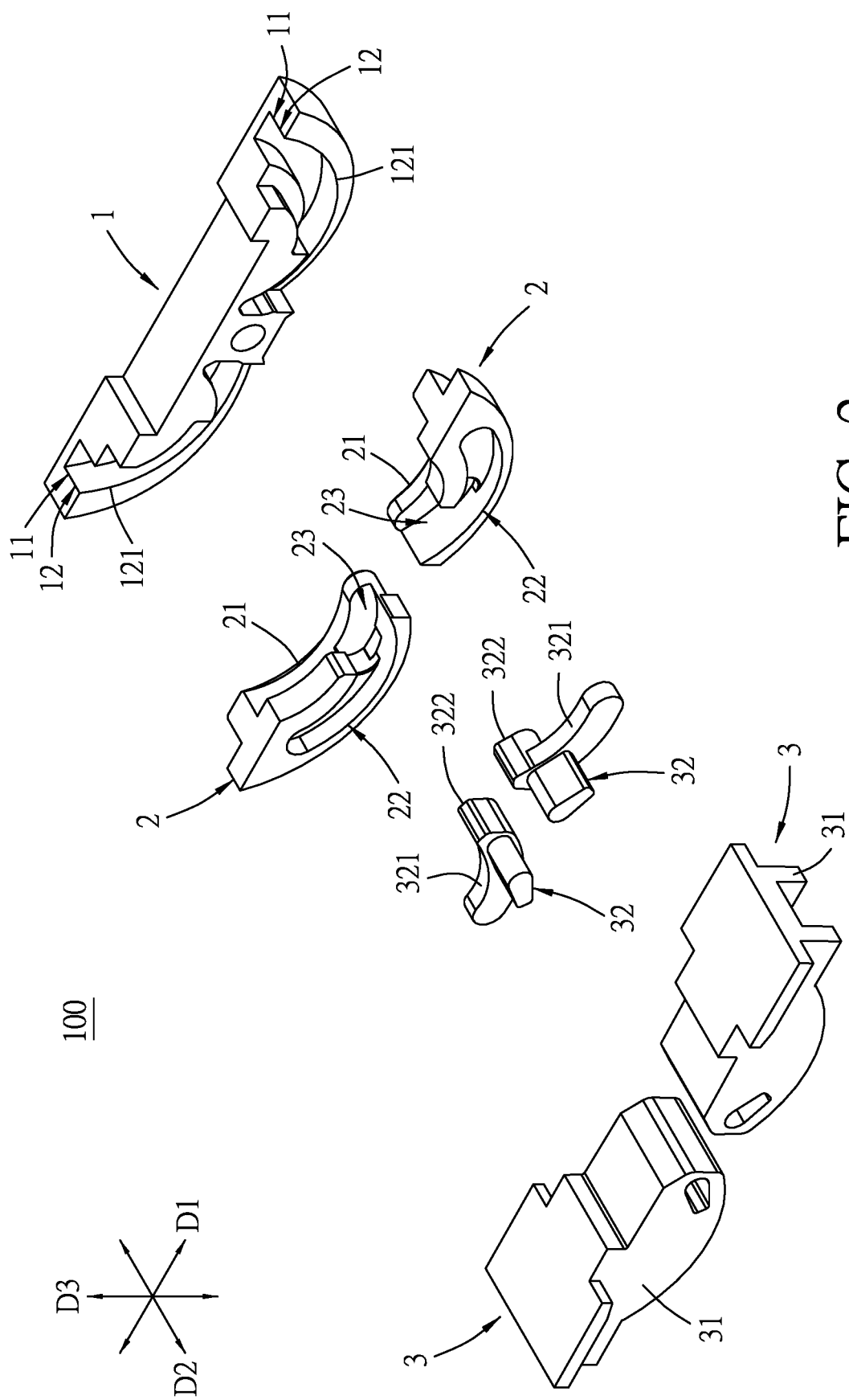
FIG. 2 is an exploded perspective view of the embodiment.
Figure 3:
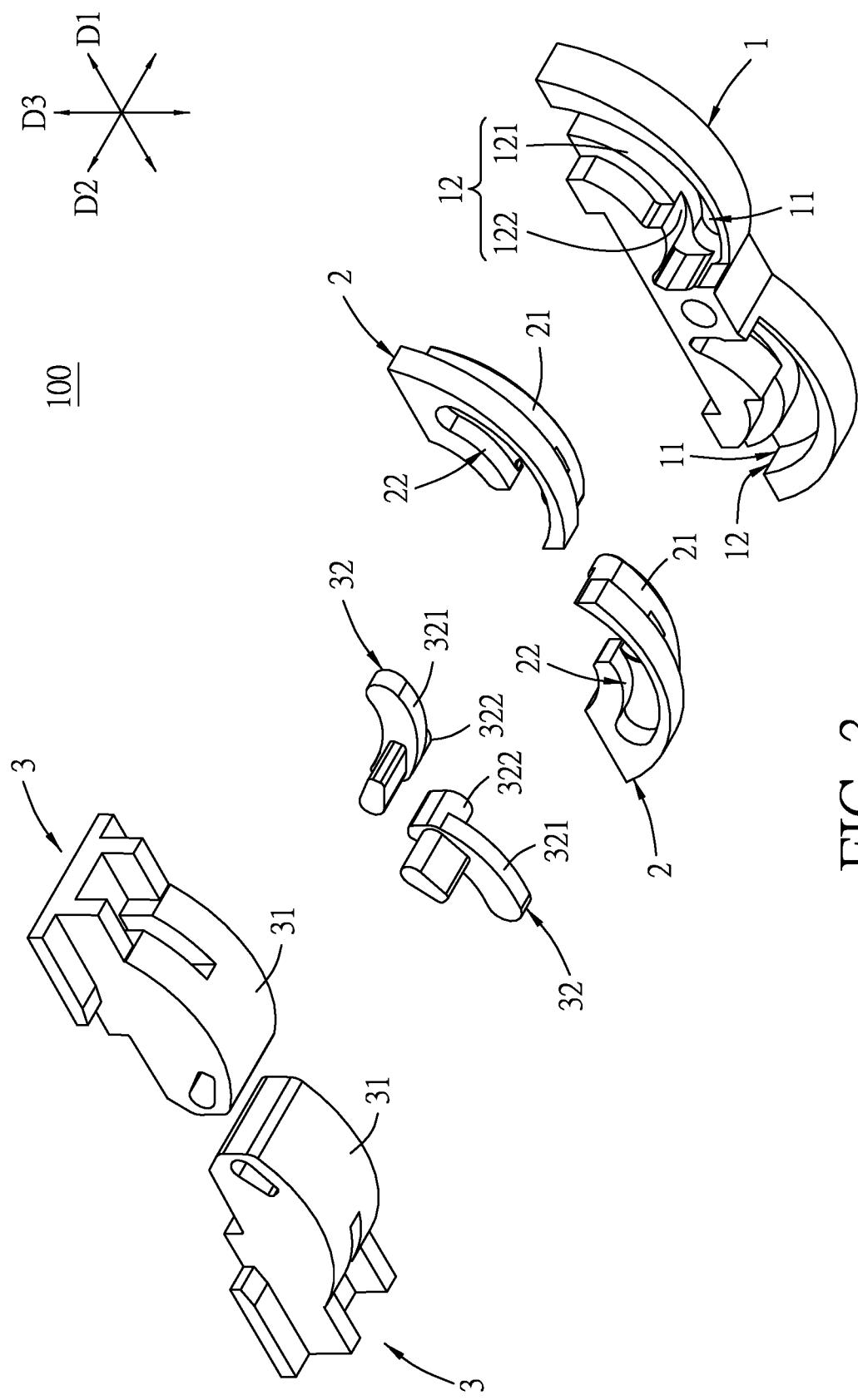
FIG. 3 is an exploded perspective view of the embodiment taken from another angle.

Referring to FIGS. 1 to 3, an embodiment of a hinge 100 according to the disclosure is disposed between two housing bodies (not shown) of a foldable electronic device (not shown) to support a flexible display (not shown). The electronic device may be a mobile phone, a tablet, a portable computer, etc. The hinge 100 includes a base seat 1, two connecting members 2 and two sliding members 3.

Referring to FIGS. 1 to 5, the base seat 1 generally extends in a first direction (D1), such as a left-right direction of the electronic device, and has two first arcuate rails 11 which are spaced apart from, aligned with and symmetric to each other in the first direction (D1). Each of the first arcuate rails 11 is recessed in a second direction (D2) that is transverse to the first direction (D1), such as a front-rear direction of the electronic device, and extends around a first rotating axis (A1) which extends in the second direction (D2) and is above the base seat 1. The first rotating axes (A1) of the first arcuate rails 11 are spaced apart from and aligned with each other in the first direction (D1). Each of the first arcuate rails 11 has a first initial end 111 and a first terminal end 112. The first initial ends 111 of the first arcuate rails 11 are proximate to each other in the first direction (D1), and the first terminal ends 112 of the first arcuate rails 11 are distal from each other in the first direction (D1).

The connecting members 2 are disposed to the first arcuate rails 11, respectively. Each connecting member 2 is in the form of a plate, and has a first sliding portion 21 which is matingly engaged with and slidable along the respective first arcuate rail 11 to permit rotation of each connecting member 2 about the first rotating axis (A1) relative to the base seat 1, and a second arcuate rail 22 which is formed opposite to the first sliding portion 21 in the second direction (D2). The second arcuate rail 22 is recessed in the second direction (D2) and extends around a second rotating axis (A2). The second rotating axis (A2) is parallel to and offset from the first rotating axis (A1) and is above the base seat 1 in a third direction (D3) which is transverse to both the first direction (D1) and the second direction (D2). The second rotating axes (A2) of the second arcuate rails 22 are spaced apart from and aligned with each other in the first direction (D1). Each second arcuate rail 22 has a second initial end 221 and a second terminal end 222. The second initial ends 221 of the second arcuate rails 22 are proximate to each other in the first direction (D1), and the second terminal ends 222 of the second arcuate rails 22 are distal from each other in the first direction (D1).

The sliding members 3 are disposed to the second arcuate rails 22 of the two connecting members 2, respectively. Each sliding member 3 has a second sliding portion 321 which is matingly engaged with and slidable along the second arcuate rail 22 to permit rotation of each sliding member 3 about the second rotating axis (A2) relative to the corresponding connecting member 2. In this embodiment, each sliding member 3 has a mounting body 31 for mounting one housing body of the electronic device thereon, and a sliding body 32 which is engaged with the mounting body 31. Alternatively, each sliding member 3 may have an integrally formed structure.

Figure 7:
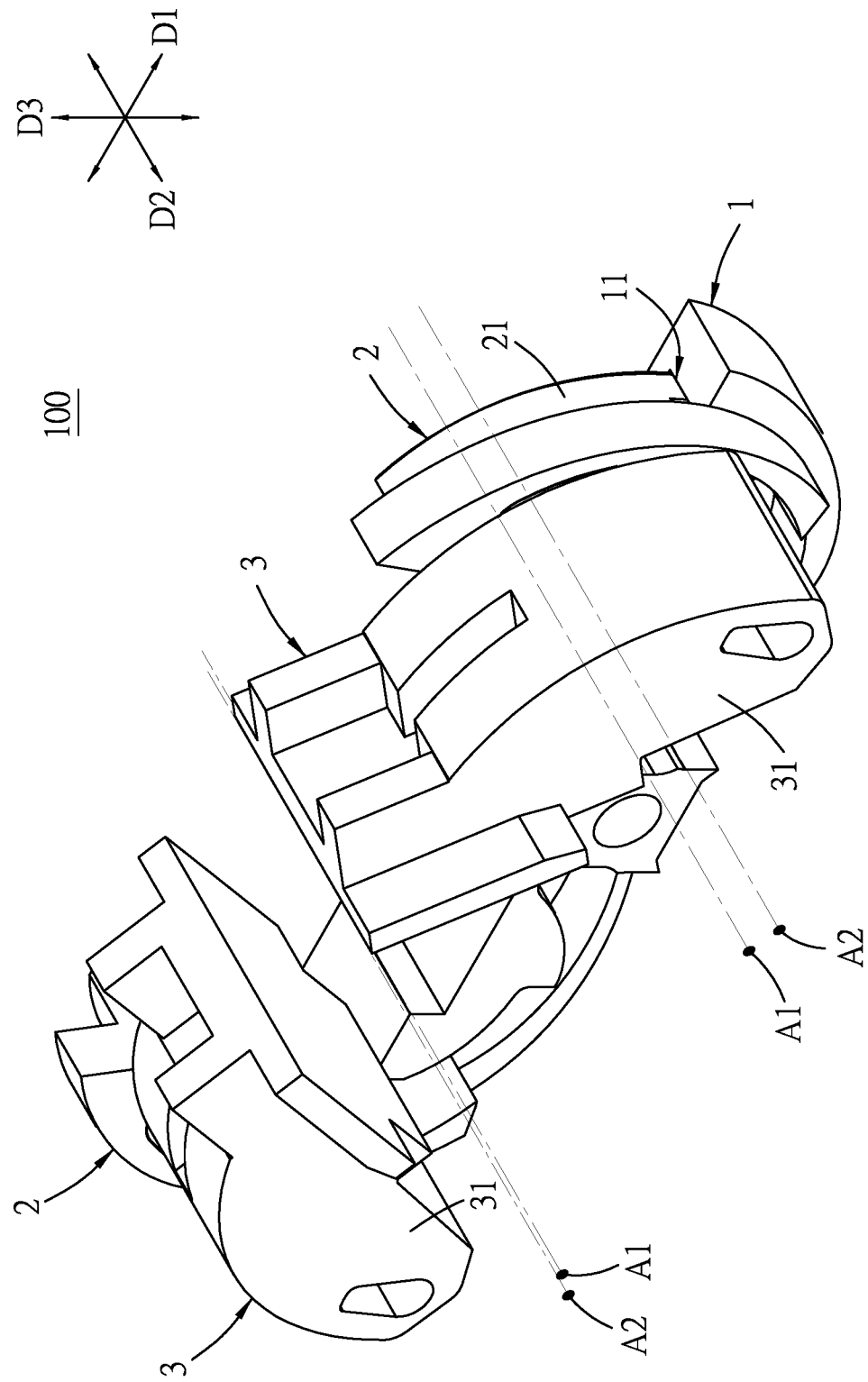
FIG. 7 is a perspective view of the embodiment illustrating a state when the sliding members are in a terminal position.

With the mating engagement of the first arcuate rails 11 with the first sliding portions 21, and the mating engagement of the second arcuate rails 22 with the second sliding portions 321, the two sliding members 3 are rotatable relative to the base seat 1 between an initial position (as shown in FIG. 1) and a terminal position (as shown in FIG. 7). Also, with the first arcuate rails 11 extending around the first rotating axes (A1) and the second arcuate rails 22 extending around the second rotating axes (A2), each of the sliding members 3 is rotatable relative to the base seat 1 about the first rotating axis (A1) and the second rotating axis (A2), which renders the two sliding members 3 with a variational rotating path. Additionally, the positions of the first rotating axes (A1) and the second rotating axes (A2) can be varied and adjusted according to the flexible display of the electronic device so as to meet the bending requirement of the flexible display.

In this embodiment, a curvature of the first arcuate rails 11 is different from a curvature of the second arcuate rails 22. The curvatures of the first arcuate rails 11 and the second arcuate rails 22 can be varied and adjusted to meet the bending requirement of the flexible display. In various embodiments, the curvature of the first arcuate rails 11 may be the same as that of the second arcuate rails 22.

With reference to FIGS. 1 to 3 and FIG. 6, in this embodiment, the base seat 1 further has two auxiliary arcuate rails 12 which are recessed in the second direction (D2) and respectively aligned with the second sliding members 3. Each auxiliary arcuate rail 12 has first and second sections 121, 122 which are connected with each other. The first section 121 extends around the first rotating axis (A1), and the second section 122 extends around the second rotating axis (A2). The sliding body 32 of each sliding member 3 further has an auxiliary sliding portion 322 which is matingly engaged with and slidable along the respective auxiliary arcuate rail 12. Specifically, the auxiliary sliding portion 322 of each sliding member 3 projects from a terminal end of the second sliding portion 321 in the second direction (D2). Each connecting member 2 further has a leeway slot portion 23 which is in spatial communication with the second arcuate rail 22 for receiving the corresponding auxiliary sliding portion 322. The auxiliary arcuate rails 12 are respectively in spatial communication with the first arcuate rails 11. The first section 121 of each auxiliary arcuate rail 12 is generally superimposed on a part of the first arcuate rail 11 in the second direction (D2). The second section 122 of each auxiliary arcuate rail 12 is of a closed end which is configured to correspond with a part of the second arcuate rail 22 near the second initial end 221.

Figure 4:
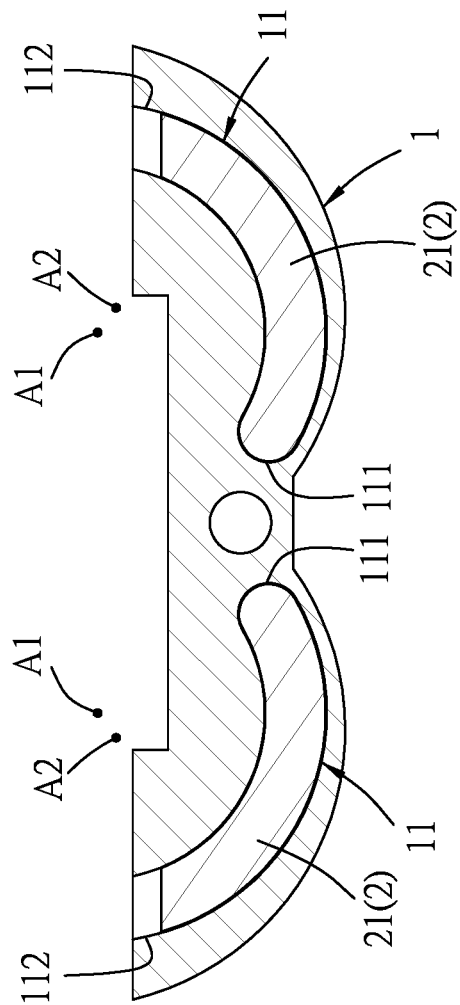
FIG. 4 is a sectional view illustrating a structure of a base seat and two connecting members and in a state when the sliding members are in the initial position.
Figure 4:
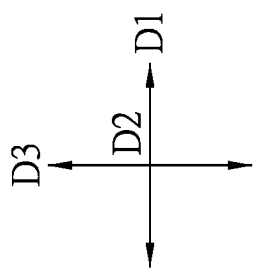
Figure 5:
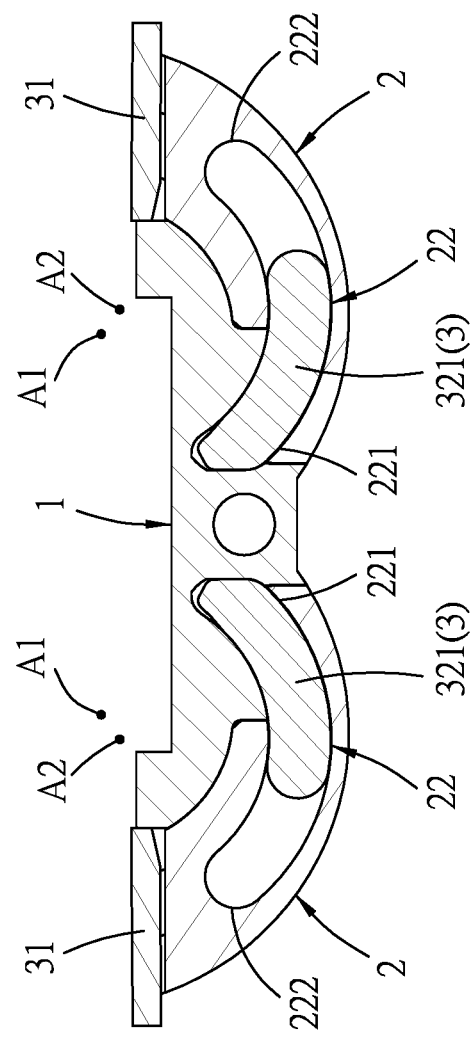
FIG. 5 is a sectional view illustrating a structure of the connecting members and the sliding members and in a state when the sliding members are in the initial position.
Figure 5:
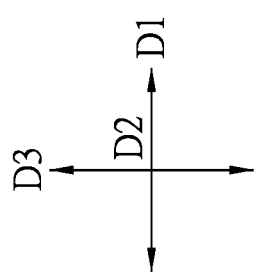
Figure 6:
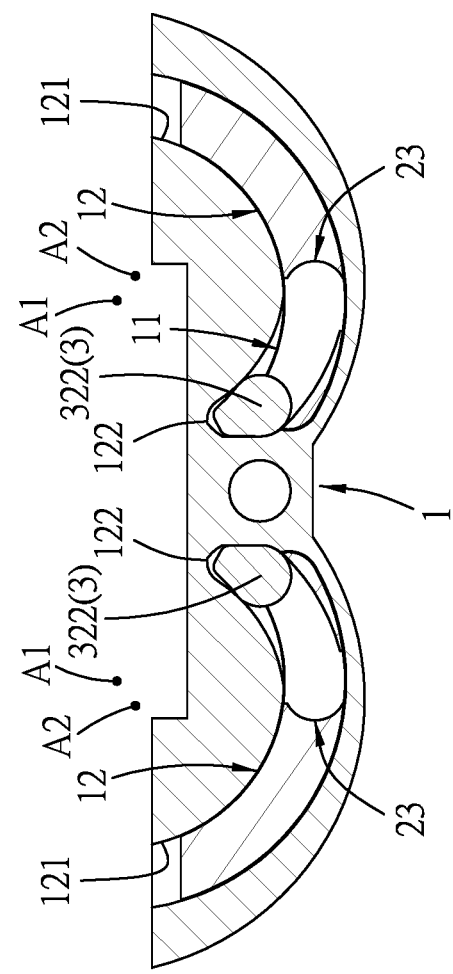
FIG. 6 is a sectional view illustrating a structure of the base seat and the sliding members and in a state when the sliding members are in the initial position.
Figure 6:
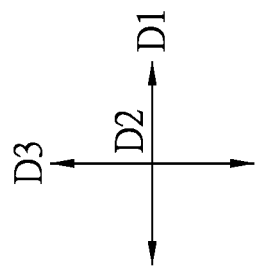

With reference to FIGS. 4 to 6, the profiles of the first arcuate rails 11 and the first sliding portions 21 generally mate with each other, and the profiles of the second arcuate rails 22 and the second sliding portions 321 generally mate with each other so as to stabilize the rotation of the two connecting members 2 relative to the base seat 1 and the rotation of the two sliding members 3 relative to the connecting members 2. Moreover, with the auxiliary arcuate rails 12 and the auxiliary sliding portions 322, the two sliding members 3 are oriented to move relative to the base seat 1 at a predetermined moving path. The auxiliary sliding portions 322 are configured to be smoothly slidable along the first sections 121 and the second sections 122 of the auxiliary arcuate rails 12.

Figure 8:
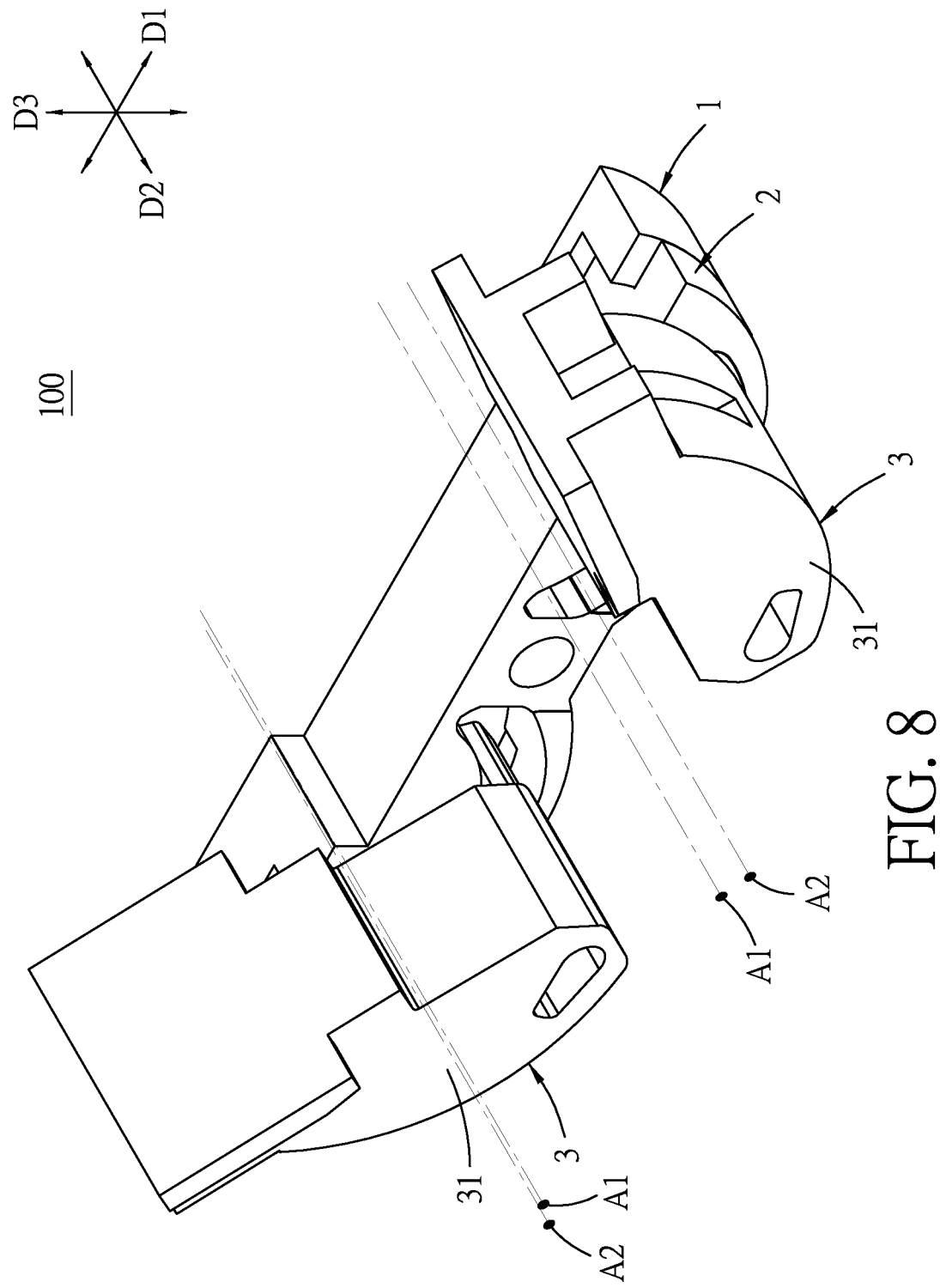
FIG. 8 is a perspective view of the embodiment illustrating a state when the sliding members are in a transit position.
Figure 9:
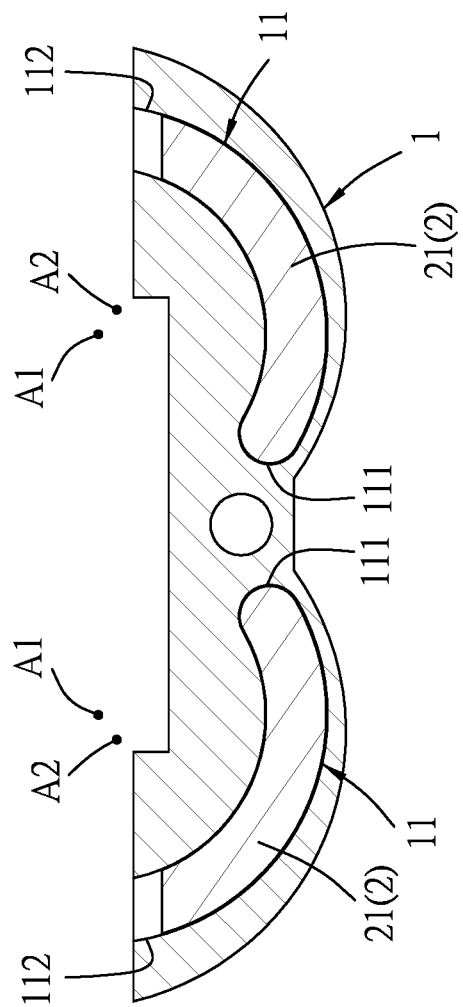
FIG. 9 is a sectional view similar to FIG. 4, illustrating a state when the sliding members are in the transit position.
Figure 9:
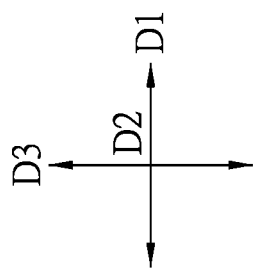
Figure 10:
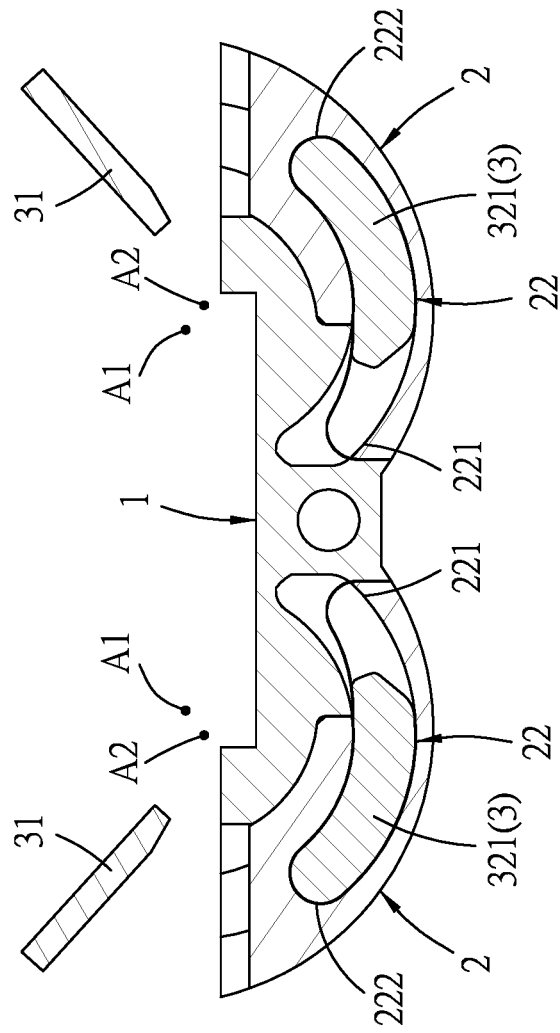
FIG. 10 is a sectional view similar to FIG. 5, illustrating a state when the sliding members are in the transit position.
Figure 10:
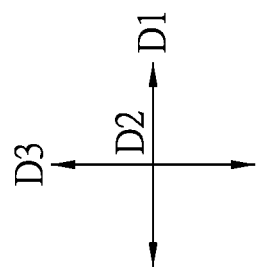

With reference to FIGS. 1, 2, 7 and 8, with the mating engagement of the auxiliary arcuate rails 12 with the auxiliary sliding portions 322, the two sliding members 3 are rotatable relative to the base seat 1 through a transit position (as shown in FIG. 7) during the rotation from the initial position (see FIG. 1) to the terminal position (as shown in FIG. 8).

Specifically, referring to FIG. 2 and FIGS. 4 to 6, in the initial position, the first sliding portions 21 of the connecting members 2 are respectively proximate to the first initial ends 111 of the first arcuate rails 11, the second sliding portions 321 of the sliding members 3 are respectively proximate to the second initial ends 221 of the second arcuate rails 22, and the auxiliary sliding portions 322 of the sliding members 3 are respectively located on the second sections 122 of the auxiliary arcuate rails 12.

Figure 11:
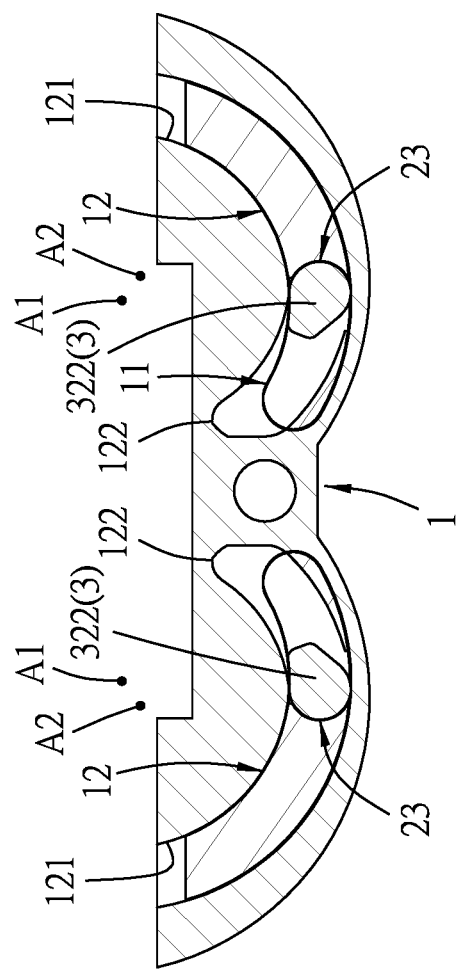
FIG. 11 is a sectional view similar to FIG. 6, illustrating a state when the sliding members are in the transit position.
Figure 11:
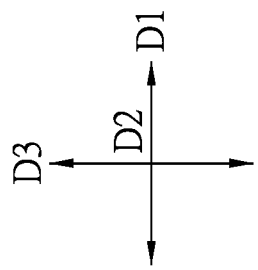
Figure 12:
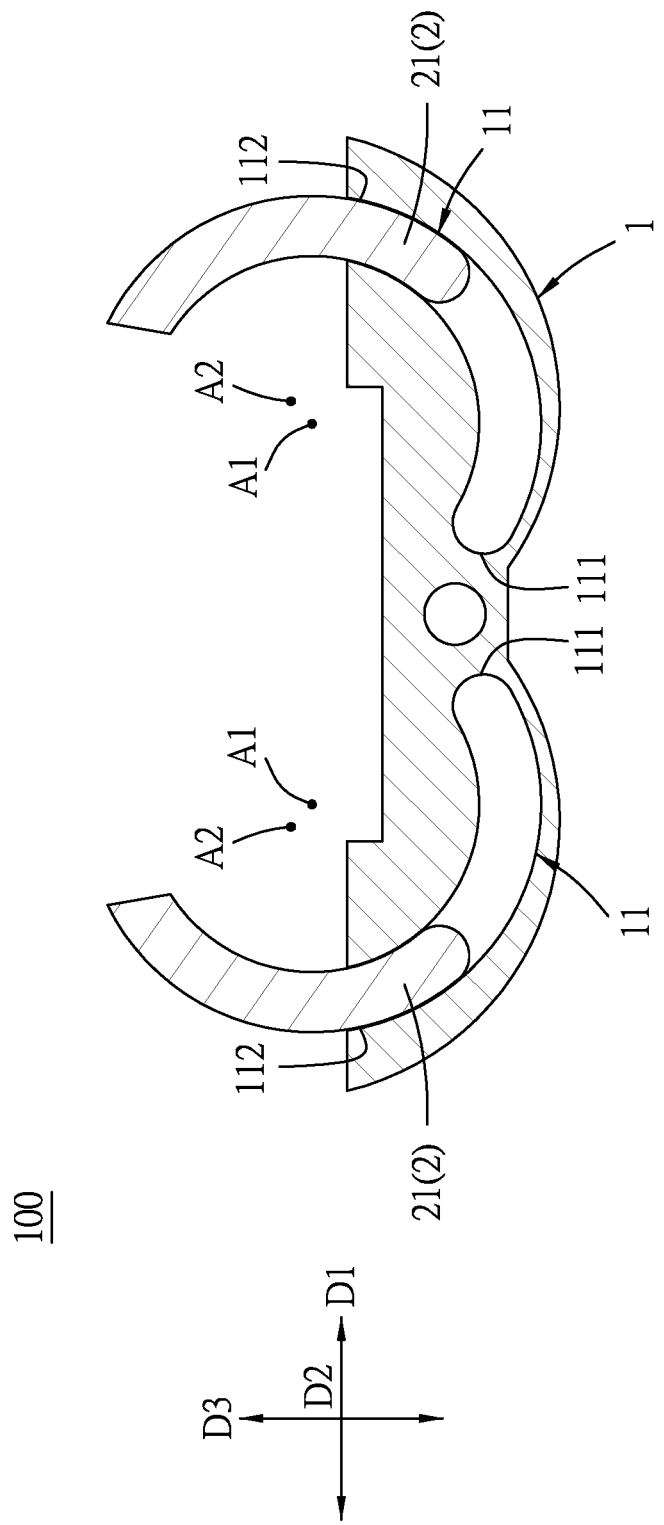
FIG. 12 is a sectional view similar to FIG. 4, illustrating a state when the sliding members are in the terminal position.
Figure 13:
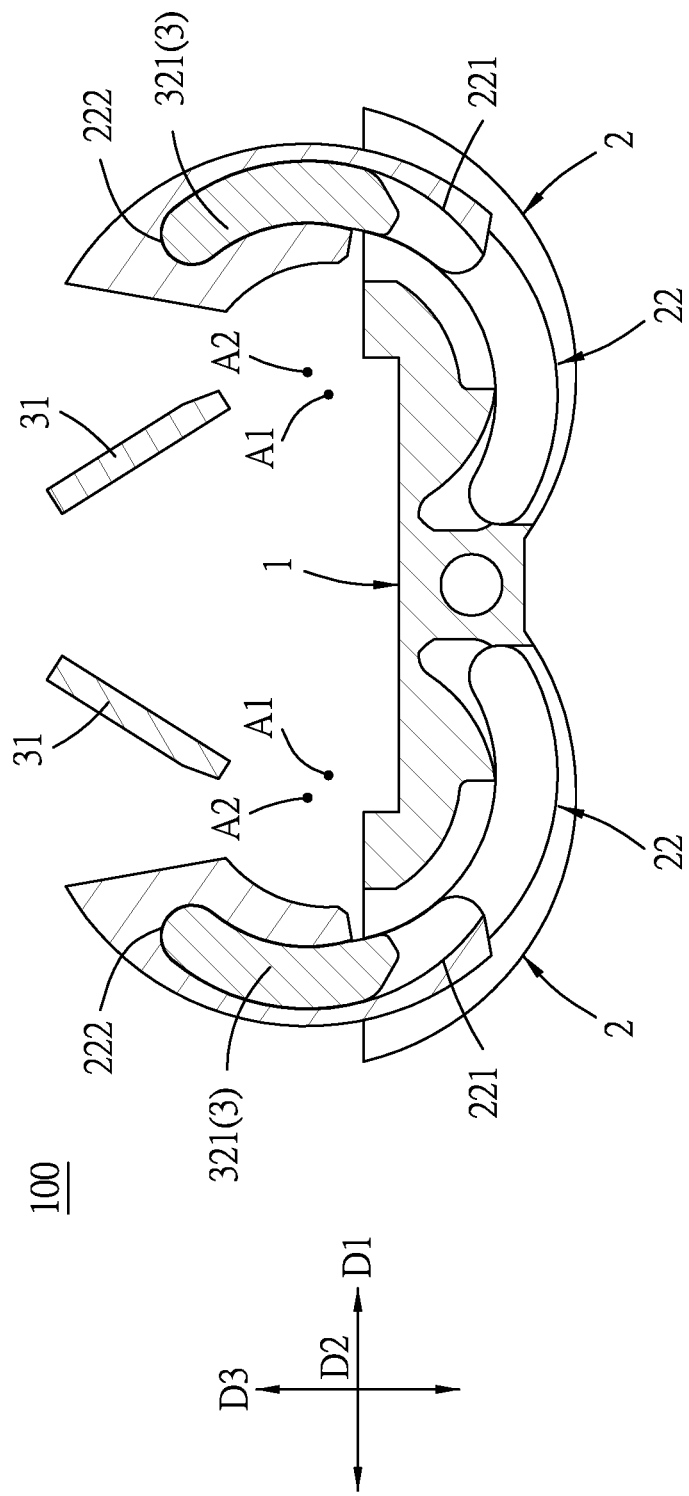
FIG. 13 is a sectional view similar to FIG. 5, illustrating a state when the sliding members are in the terminal position.

Referring to FIGS. 2, 6 and 11, when the sliding members 3 are rotated between the initial position and the transit position, the auxiliary sliding portions 322 are at least partially engaged with and slidable on the second sections 122, respectively. At this stage, the sliding members 3 are rotated relative to the base seat 1 only about the second rotating axes (A2). Thus, during this rotation, the sliding members 2 cannot be rotated about the first rotating axes (A1).

Referring to FIG. 2 and FIGS. 9 to 11, in the transit position, the first sliding portions 21 of the connecting members 2 are respectively proximate to the first initial ends 111 of the first arcuate rails 11, the second sliding portions 321 of the sliding members 3 are respectively proximate to the second terminal ends 222 of the second arcuate rails 22, and the auxiliary sliding portions 322 of the sliding members 3 are respectively located on junctures between the second sections 122 and the first sections 121 of the auxiliary arcuate rails 12.

Figure 14:
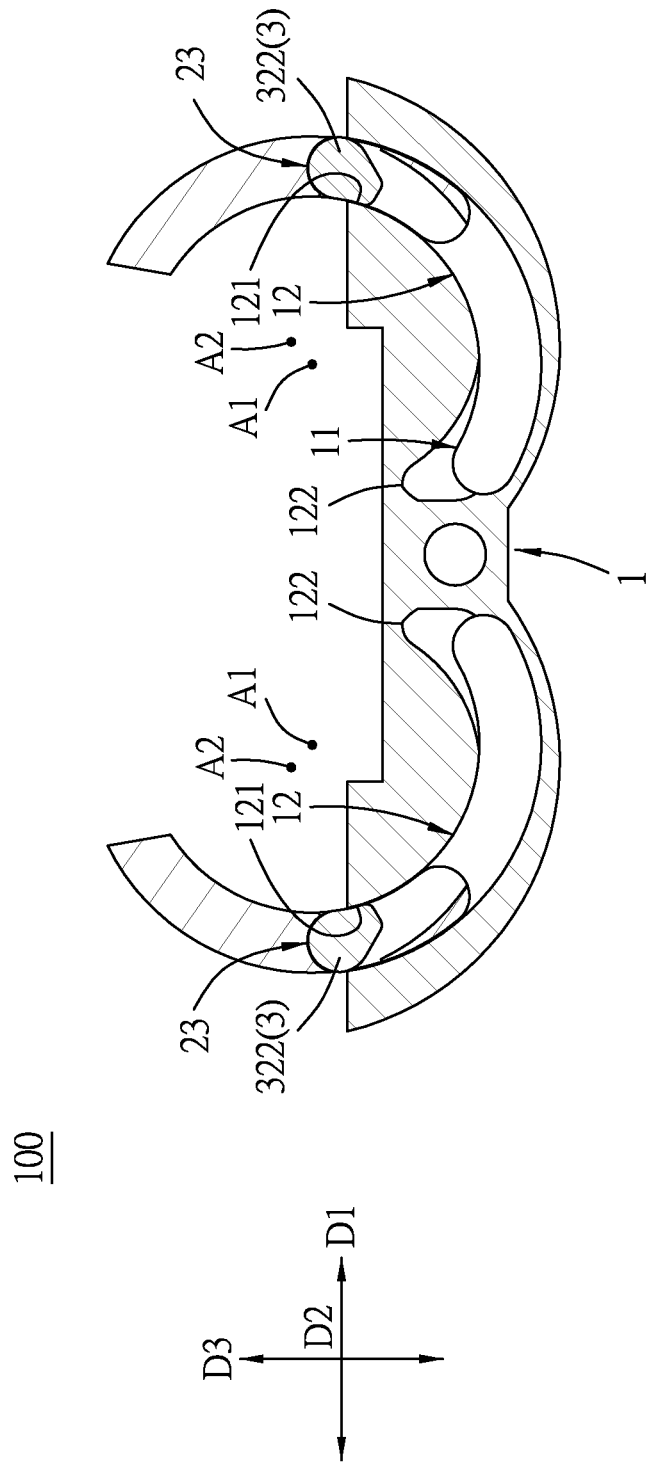
FIG. 14 is a sectional view similar to FIG. 6, illustrating a state when the sliding members are in the terminal position.

Referring to FIGS. 2, 11 and 14, when the sliding members 3 are rotated between the transit position and the terminal position, the auxiliary sliding portions 322 are at least partially engaged with and slidable on the first sections 121, respectively. At this stage, the sliding members 3 are rotated relative to the base seat 1 only about the first rotating axes (A1). Thus, the sliding members 3 and the connecting members 2 are rotated relative to the base seat 1 about the first rotating axes (A1).

Referring to FIG. 2 and FIGS. 12 to 14, in the terminal position, the first sliding portions 21 of the connecting members 2 are respectively proximate to the first terminal ends 112 of the first arcuate rails 11, the second sliding portions 321 of the sliding members 3 are respectively proximate to the second terminal ends 222, and the auxiliary sliding portions 322 of the sliding members 3 are respectively located on the first sections 121 of the auxiliary arcuate rails 12.

With reference to FIGS. 1, 7 and 8, briefly, during the rotation of the sliding members 3 from the initial position to the terminal position, the sliding members 3 are firstly rotated relative to the connecting members 2 about the second rotating axes (A2), as shown in FIG. 8. Subsequently, the sliding members 3 are rotated relative to the base seat 1 about the first rotating axes (A1), as shown in FIG. 7.

As illustrated, with the first arcuate rails 11 extending around the first rotating axes (A1) and the second arcuate rails 22 extending around the second rotating axes (A2), each of the sliding members 3 is rotatable relative to the base seat 1 about the corresponding first rotating axis (A1) and about the corresponding second rotating axis (A2) so as to generate a variational rotating path of the sliding members 3. Moreover, the positions of the first rotating axes (A1) and the second rotating axes (A2) can be varied and adjusted according to the flexible display of the electronic device so as to meet the bending requirement of the flexible display.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge comprising:
a base seat having two first arcuate rails which are spaced apart from, aligned with and symmetric to each other in a first direction, each of said first arcuate rails extending around a first rotating axis which extends in a second direction that is transverse to the first direction, the first rotating axes of said first arcuate rails being spaced apart from and aligned with each other in the first direction;
two connecting members, each having a first sliding portion which is matingly engaged with and slidable along a respective one of said first arcuate rails to permit rotation of each of said connecting members about the first rotating axis relative to said base seat, and a second arcuate rail which extends around a second rotating axis that is parallel to and offset from the first rotating axis, the second rotating axes of said second arcuate rails being spaced apart from and aligned with each other in the first direction; and
two sliding members, each having a second sliding portion which is matingly engaged with and slidable along said second arcuate rail to permit rotation of each of said sliding members about the second rotating axis relative to a corresponding one of said connecting members such that said two sliding members are rotatable relative to said base seat between an initial position and a terminal position.

2. The hinge as claimed in claim 1, wherein each of said first arcuate rails has a first initial end and a first terminal end, said first initial ends of said first arcuate rails being proximate to each other in the first direction and said first terminal ends of said first arcuate rails being distal from each other in the first direction, each of said second arcuate rails having a second initial end and a second terminal end, said second initial ends of said second arcuate rails being proximate to each other in the first direction and said second terminal ends of said second arcuate rails being distal from each other in the first direction, said two sliding members being rotatable relative to said base seat through a transit position during the rotation from the initial position to the terminal position, wherein: in the initial position, said first sliding portions of said two connecting members are respectively proximate to said first initial ends of said first arcuate rails, and said second sliding portions of said two sliding members are respectively proximate to said second initial ends of said second arcuate rails; in the transit position, said first sliding portions are respectively proximate to said first initial ends, and said second sliding portions are respectively proximate to said second terminal ends of said second arcuate rails; and in the terminal position, said first sliding portions are respectively proximate to said first terminal ends of said first arcuate rails, and said second sliding portions are respectively proximate to said second terminal ends.

3. The hinge as claimed in claim 2, wherein said base seat further has two auxiliary arcuate rails, each having first and second sections which are connected with each other, said first section extending around the first rotating axis, said second section extending around the second rotating axis, each of said sliding members further having an auxiliary sliding portion which is matingly engaged with and slidable along a respective one of said auxiliary arcuate rails such that, when said two sliding members are rotated between the initial position and the transit position, said auxiliary sliding portions are at least partially engaged with said second sections, respectively, and such that, when said two sliding members are rotated between the transit position and the terminal position, said auxiliary sliding portions are at least partially engaged with said first sections, respectively.

4. The hinge as claimed in claim 3, wherein said auxiliary sliding portion of each of said sliding members projects from said second sliding portion in the second direction.

5. The hinge as claimed in claim 1, wherein a curvature of said first arcuate rails is different from a curvature of said second arcuate rails.

* * * * *